(12) United States Patent
Hase et al.

(10) Patent No.: US 8,652,003 B2
(45) Date of Patent: Feb. 18, 2014

(54) TRANSMISSION DEVICE AND CONTROLLING METHOD THEREOF

(75) Inventors: Shigekazu Hase, Nishio (JP); Nobuhiro Iwai, Anjo (JP); Hiroshi Tsutsui, Nishio (JP)

(73) Assignee: Aisin AW Co., Ltd., Anjo (JP)

(*) Notice: Subject to any disclaimer, the term of this patent is extended or adjusted under 35 U.S.C. 154(b) by 98 days.

(21) Appl. No.: 13/287,711

(22) Filed: Nov. 2, 2011

(65) Prior Publication Data

US 2012/0115680 A1    May 10, 2012

(30) Foreign Application Priority Data

Nov. 10, 2010   (JP) ................................ 2010-252179

(51) Int. Cl.
*B60W 10/00*    (2006.01)
*B60W 10/02*    (2006.01)
*B60W 10/04*    (2006.01)

(52) U.S. Cl.
USPC .............. 477/79; 477/86; 477/174; 477/180

(58) Field of Classification Search
USPC .................. 477/79, 80, 86, 174, 175, 180
See application file for complete search history.

(56) References Cited

U.S. PATENT DOCUMENTS

| | | | |
|---|---|---|---|
| 5,782,711 A | 7/1998 | Tsutsui et al. | |
| 5,853,349 A | 12/1998 | Shimada et al. | |
| 6,259,983 B1 | 7/2001 | Tsutsui et al. | |
| 6,503,165 B1* | 1/2003 | Kubo et al. | 475/125 |
| 8,190,339 B2* | 5/2012 | Sato et al. | 701/55 |
| 8,244,441 B2* | 8/2012 | Araki et al. | 701/58 |
| 2008/0176710 A1* | 7/2008 | Nohara et al. | 477/156 |

FOREIGN PATENT DOCUMENTS

| | | |
|---|---|---|
| JP | 9-170654 A | 6/1997 |
| JP | 9-184568 A | 7/1997 |
| JP | 10-299880 A | 11/1998 |
| JP | 11-63202 A | 3/1999 |
| JP | 11-82704 A | 3/1999 |
| JP | 2003-130205 A | 5/2003 |
| JP | A-2008-025624 | 2/2008 |

OTHER PUBLICATIONS

Jan. 24, 2012 International Search Report issued in PCT/JP2011/075353 (with translation).

* cited by examiner

*Primary Examiner* — Tisha Lewis
(74) *Attorney, Agent, or Firm* — Oliff PLC

(57) ABSTRACT

A transmission configured with a speed change control unit which, when upshifting the speed in an accelerator on condition, executes an engagement control including a torque phase control after executing a filling control, which controls the hydraulic control unit in such a way that a hydraulic servo of the engagement side frictional engagement element is filled with hydraulic oil, and a standby control, which controls the hydraulic control unit in such a way that hydraulic pressure for the hydraulic servo is maintained at a preset standby pressure. A correction unit is configured to correct at least one of an execution time of the filling control and the standby pressure to an increment side when a fluctuation in a rotational acceleration of the input shaft exceeding a preset determination reference is detected after the standby control.

8 Claims, 10 Drawing Sheets

FIG.3

|  | C-1 | C-2 | C-3 | B-1 | B-2 | F-1 |
|---|---|---|---|---|---|---|
| P |  |  |  |  |  |  |
| REV |  |  | ○ |  | ○ |  |
| N |  |  |  |  |  |  |
| D 1st | ○ |  |  |  | ● | ○ |
| D 2nd | ○ |  |  | ○ |  |  |
| D 3rd | ○ |  | ○ |  |  |  |
| D 4th | ○ | ○ |  |  |  |  |
| D 5th |  | ○ | ○ |  |  |  |
| D 6th |  | ○ |  | ○ |  |  |

※ ○: ENGAGED    ●: ENGAGED WHEN ENGINE-BRAKING

TRANSMISSION DEVICE AND CONTROLLING METHOD THEREOF

INCORPORATION BY REFERENCE

The disclosure of Japanese Patent Application No. 2010-252179 filed on Nov. 10, 2010, including the specification, drawings and abstract thereof, is incorporated herein by reference in its entirety.

BACKGROUND OF THE INVENTION

1. Field of the Invention

The present invention relates to a transmission device which can transmit power imparted to an input shaft to an output shaft while changing a speed by switching an engagement side frictional engagement element which is at least one of a plurality of hydraulic frictional engagement elements, each of which operates with hydraulic pressure from a hydraulic control unit, from a released condition to an engaged condition, and to a control method thereof.

2. Description of the Related Art

To date, as a control unit of this kind of transmission device, there has been known one which, when instructed to execute a clutch-to-clutch speed change wherein a speed change is achieved by a release of a release side frictional engagement element and an engagement of an engagement side frictional engagement element, detects a speeding up of a power source, wherein an actual rotation speed of the power source rises higher by a predetermined value or more than a rotation speed calculated from a rotation speed of an output shaft of a transmission device and a speed change ratio before the speed change, and when detecting the speeding up, learns and corrects a constant pressure standby pressure, a fast fill time, and the like, of the release side frictional engagement element and engagement side frictional engagement element (for example, refer to JP-A-2008-25624). This transmission device control unit obtains a speeding start time from the instruction to execute the clutch-to-clutch speed change until the start of the speeding up, and based on the speeding start time, determines which one of the release side frictional engagement element and engagement side frictional engagement element causes the speeding up. Then, this control unit, in order that a speeding up or tie-up in the clutch-to-clutch speed change is smoothly resolved, carries out a learning and correction based on a determination result in such a way that a speeding cause side learning and correction value changes greatly in comparison with a non-cause side one, thus achieving a swift resolution of the speeding up or tie-up in the clutch-to-clutch speed change while suppressing a delay in conclusion due to a learning and correction value relating to a non-cause side frictional engagement element increasing unnecessarily.

SUMMARY OF THE INVENTION

The heretofore described kind of speeding up of the power source occurs due to a start of engagement (a start of torque capacity acquisition) of the engagement side frictional engagement element being delayed with respect to the release of the release side frictional engagement element, but the delay itself in the start of engagement of the engagement side frictional engagement element causes a shock due to a rapid engagement of the engagement side frictional engagement element. Consequently, with the transmission device, when a delay occurs in the start of engagement of the engagement side frictional engagement element, it is required to be swiftly resolved. However, it is not possible to effectively resolve the delay in the start of engagement of the engagement side frictional engagement element even in the event that a command value for the engagement side frictional engagement element is learned and corrected in accordance with the detection of the speeding up of the power source, as with the heretofore known transmission device heretofore described. That is, when a delay occurs in the release of the release side frictional engagement element when upshifting the speed in an accelerator on condition, it is often the case that no speeding up of the power source occurs even in the event that the start of engagement of the engagement side frictional engagement element is delayed. Also, when a one-way clutch assumes the role of the release side frictional engagement element before the speed is upshifted, no speeding up of the power source occurs even in the event that the start of engagement of the engagement side frictional engagement element is delayed when upshifting the speed in the accelerator on condition. Furthermore, as the heretofore described speeding up of the power source is not desirable in terms of the durability, or the like, of the power source and transmission device, the transmission device should originally be designed in such a way as to suppress the speeding up of the power source as much as possible. For this reason, as the occasion to learn and correct itself is not particularly ensured even in the event that the constant pressure standby pressure, or the like, of the engagement side frictional engagement element is learned and corrected in accordance with the detection of the speeding up of the power source, as with the heretofore known transmission device heretofore described, it is difficult to effectively resolve the delay in the start of engagement of the engagement side frictional engagement element, and suppress the occurrence of the shock due to the rapid engagement of the relevant engagement side frictional engagement element.

Therefore, the transmission device of the invention and the controlling method thereof have a main object of effectively suppressing an occurrence of a shock due to a rapid engagement of an engagement side frictional engagement element caused by a delay in the start of engagement of the engagement side frictional engagement element when upshifting a speed in an accelerator on condition.

The transmission device according to the invention and the controlling method thereof adopt the following mechanism in order to achieve the heretofore described main object.

The transmission device according to the invention is a transmission device which can transmit power imparted to an input shaft to an output shaft while changing a speed by switching an engagement side frictional engagement element, which is at least one of a plurality of hydraulic frictional engagement elements which operate with hydraulic pressure from a hydraulic control unit, from a released condition to an engaged condition, including:

a speed change control unit which, when upshifting the speed in an accelerator on condition, executes an engagement control including a torque phase control after executing a filling control, which controls the hydraulic control unit in such a way that a hydraulic servo of the engagement side frictional engagement element is filled with hydraulic oil, and a standby control, which controls the hydraulic control unit in such a way that hydraulic pressure for the hydraulic servo is maintained at a preset standby pressure; and a correction unit which corrects at least one of an execution time of the filling control and the standby pressure to an increment side when a fluctuation in a rotational acceleration of the input shaft exceeding a preset determination reference is detected after the standby control.

With this transmission device, when upshifting the speed in the accelerator on condition by switching the engagement side frictional engagement element from the released condition to the engaged condition, the engagement control including the torque phase control is executed after the execution of the filling control, which controls the hydraulic control unit in such a way that the hydraulic servo of the engagement side frictional engagement element is filled with hydraulic oil, and the standby control, which controls the hydraulic control unit in such a way that the hydraulic pressure for the hydraulic servo is maintained at the preset standby pressure. The filling control and standby control are executed in order to gently engage the engagement side frictional engagement element, which is switched from the released condition to the engaged condition when upshifting the speed in the acceleration on condition, without causing an engagement shock during the standby control or early in a torque phase, and provide the relevant engagement side frictional engagement element with torque capacity. Herein, when the torque phase control is executed with the start of engagement of the engagement side frictional engagement element remaining delayed, without a speeding up of a power source connected to the transmission device occurring, when upshifting the speed in the accelerator on condition, the engagement side frictional engagement element is rapidly engaged accompanying an increase in the hydraulic pressure for the engagement side frictional engagement element due to the execution of the torque phase control. Also, when the engagement of the engagement side frictional engagement element is started when upshifting the speed in the accelerator on condition, a fluctuation (a temporary drop) occurs in the rotational acceleration (a per unit time amount of change in rotation speed) of the input shaft due to the relevant engagement side frictional engagement element being provided with torque capacity. Then, the more rapidly the engagement side frictional engagement element is engaged, the higher the degree of a fluctuation in the rotational acceleration of the input shaft accompanying the start of engagement of the engagement side frictional engagement element. With the transmission device of the invention, focusing on a relationship between a rapid engagement of the engagement side frictional engagement element and a fluctuation in the rotational acceleration of the input shaft, when the start of engagement of the engagement side frictional engagement element is delayed, and there is no speeding up of the power source connected to the transmission device, when upshifting the speed in the accelerator on condition, it is taken that at least one of the execution time of the filling control and the standby pressure is corrected to the increment side when the fluctuation in the rotational acceleration of the input shaft exceeding the preset determination reference is detected after the standby control. Because of this, once the fluctuation in the rotational acceleration of the input shaft exceeding the determination reference is detected after the standby control for an engagement side frictional engagement element, the execution time of the filling control, and the like, for the engagement side frictional engagement element is corrected in such a way that the filling of the hydraulic servo with hydraulic oil is prompted by the time of the start of the torque phase control, meaning that it is possible after that to effectively resolve the delay in the start of engagement of the relevant engagement side frictional engagement element, and furthermore, it is possible to effectively suppress the shock caused by the rapid engagement of the engagement side frictional engagement element during the execution of the torque phase control.

Also, the correction unit may correct at least one of the execution time of the filling control and the standby pressure to the increment side on the condition that a value obtained by subtracting a minimum value of the rotational acceleration of the input shaft in a period from an amount of change in the rotational acceleration exceeding a predetermined amount after the torque phase control has been started until the torque phase control finishes from a rotational acceleration of the input shaft at the start of the torque phase control is equal to or greater than a first threshold value acting as the determination reference. Because of this, it is possible to more accurately comprehend the size (degree) of the fluctuation in the rotational acceleration of the input shaft caused by the start of engagement of the engagement side frictional engagement element after the start of the torque phase control, and it is possible to more appropriately determine the necessity or otherwise of the correction of the execution time of the filling control, and the like, based on the size of the relevant fluctuation in the rotational acceleration of the input shaft. Then, in this way, by assuming that the execution time of the filling control, and the like, is not corrected to the increment side when the fluctuation in the rotational acceleration of the input shaft caused by the start of engagement of the engagement side frictional engagement element after the start of the torque phase control is comparatively small, it is possible to prevent the engagement side frictional engagement element being rapidly engaged during the execution of the filling control and standby control due to overcorrecting the execution time of the filling control, and the like, to the increment side.

Furthermore, the correction unit may correct at least one of the execution time of the filling control and the standby pressure to the increment side on the condition that a minimum value of a per unit time amount of change in the rotational acceleration of the input shaft in the period from the amount of change in the rotational acceleration exceeding the predetermined amount after the torque phase control has been started until the torque phase control finishes is less than a second threshold value acting as the determination reference. Because of this, it is possible to more accurately comprehend the steepness (degree) of the fluctuation in the rotational acceleration of the input shaft caused by the start of engagement of the engagement side frictional engagement element after the start of the torque phase control, and it is possible to more appropriately determine the necessity or otherwise of the correction of the execution time of the filling control, and the like, based on the steepness of the relevant fluctuation in the rotational acceleration of the input shaft. Then, in this way, by assuming that the execution time of the filling control, and the like, is not corrected to the increment side when the steepness of the fluctuation in the rotational acceleration of the input shaft caused by the start of engagement of the engagement side frictional engagement element after the start of the torque phase control is comparatively small, it is possible to prevent the engagement side frictional engagement element being rapidly engaged during the execution of the filling control and standby control due to overcorrecting the execution time of the filling control, and the like, to the increment side.

Also, the correction unit may correct at least one of the execution time of the filling control and the standby pressure to the increment side on the condition that a difference between the minimum value of the rotational acceleration of the input shaft in the period from the amount of change in the rotational acceleration exceeding the predetermined amount after the torque phase control has been started until the torque phase control finishes and a maximum value of the rotational acceleration of the input shaft after an occurrence of the minimum value is equal to or greater than a third threshold value acting as the determination reference. Because of this, after more accurately comprehending an amount of change (a recovery) in the rotational acceleration of the input shaft accompanying a conclusion of the fluctuation in the rotational acceleration of the input shaft caused by the start of engagement of the engagement side frictional engagement element after the start of the torque phase control, it is possible to more appropriately determine the necessity or otherwise of the correction of the execution time of the filling control, and it is possible to prevent the execution time of the filling control, and the like, being overcorrected to the increment side.

Furthermore, the correction unit may correct at least one of the execution time of the filling control and the standby pressure to the increment side on the condition that a time from the torque phase control being started until the amount of change in the rotational acceleration of the input shaft exceeds the predetermined amount is equal to or greater than a predetermined time. In this way, by checking a time needed for the rotational acceleration of the input shaft to change by the predetermined amount after the start of the torque phase control, it is possible to more appropriately determine whether or not the shock has occurred accompanying a fluctuation in the rotational acceleration of the input shaft caused by the start of engagement of the engagement side frictional engagement element during the execution of the torque phase control. Then, as there is comparatively less fear of an occurrence of the shock even in the event that the engagement side frictional engagement element is engaged comparatively early in the torque phase, by assuming that the execution time of the filling control, and the like, is not corrected to the increment side when the time from the torque phase control being started until the amount of change in the rotational acceleration of the input shaft exceeds the predetermined amount in this way is less than the predetermined time, it is possible to prevent the engagement side frictional engagement element being rapidly engaged during the execution of the filling control and standby control due to overcorrecting the execution time of the filling control, and the like, to the increment side.

Also, the transmission device may include a determination unit which determines whether or not a fluctuation in the rotational acceleration of the input shaft caused by a start of engagement of the engagement side frictional engagement element has occurred while the standby control is executed, and when it is determined by the determination unit that the fluctuation in the rotational acceleration of the input shaft caused by the start of engagement of the engagement side frictional engagement element has not occurred, the correction unit may determine whether or not the fluctuation in the rotational acceleration of the input shaft exceeding the determination reference has been detected after the standby control. That is, by overcorrecting the execution time of the filling control, and the like, to the increment side, there is even more fear that the engagement side frictional engagement element is rapidly engaged during the filling control and standby control. Consequently, after confirming that the engagement side frictional engagement element has not been engaged during the execution of the standby control, that is, by the time the torque phase control is started, by checking a fluctuation in the rotational acceleration of the input shaft after the standby control, it is possible to more effectively prevent the engagement side frictional engagement element being rapidly engaged during the execution of the filling control and standby control due to overcorrecting the execution time of the filling control, and the like, to the increment side.

Furthermore, when a value obtained by subtracting the rotational acceleration of the input shaft at the start of the torque phase control from a maximum value of the rotational acceleration of the input shaft while the filling control is executed is less than a preset fourth threshold value, the determination unit may determine that the fluctuation in the rotational acceleration of the input shaft caused by the start of engagement of the engagement side frictional engagement element has not occurred while the standby control is executed. Because of this, it is possible to more appropriately determine whether or not the engagement side frictional engagement element has been engaged while the standby control is executed.

The transmission device control method according to the invention is a control method of a transmission device which can transmit power imparted to an input shaft to an output shaft while changing a speed by switching an engagement side frictional engagement element which is at least one of a plurality of hydraulic frictional engagement elements, each of which operates with hydraulic pressure from a hydraulic control unit, from a released condition to an engaged condition, including:

(a) a step of, when upshifting the speed in an accelerator on condition, executing an engagement control including a torque phase control after executing a filling control, which controls the hydraulic control unit in such a way that a hydraulic servo of the engagement side frictional engagement element is filled with hydraulic oil, and a standby control, which controls the hydraulic control unit in such a way that hydraulic pressure for the hydraulic servo is maintained at a preset standby pressure; and (b) a step of correcting at least one of an execution time of the filling control and the standby pressure to an increment side when a fluctuation in a rotational acceleration of the input shaft exceeding a preset determination reference is detected after the standby control.

According to this method, once the fluctuation in the rotational acceleration of the input shaft exceeding the preset determination reference is detected after the standby control for an engagement side frictional engagement element, the execution time of the standby control, and the like, for the engagement side frictional engagement element is corrected in such a way that the filling of the hydraulic servo of the engagement side frictional engagement element with hydraulic oil is prompted by the time of the start of the torque phase control, meaning that it is possible after that to effectively resolve the delay in the start of engagement of the engagement side frictional engagement element, and furthermore, it is possible to effectively suppress the shock caused by the rapid engagement of the engagement side frictional engagement element during the execution of the torque phase control.

BRIEF DESCRIPTION OF THE DRAWINGS

FIG. 3 is an operation table showing a relationship between each speed of an automatic transmission 25 configuring the transmission device according to the working example of the invention and the operating conditions of clutches and brakes;

DETAILED DESCRIPTION OF THE EMBODIMENTS

Next, a mode for carrying out the invention will be described using a working example.

Figure 1:
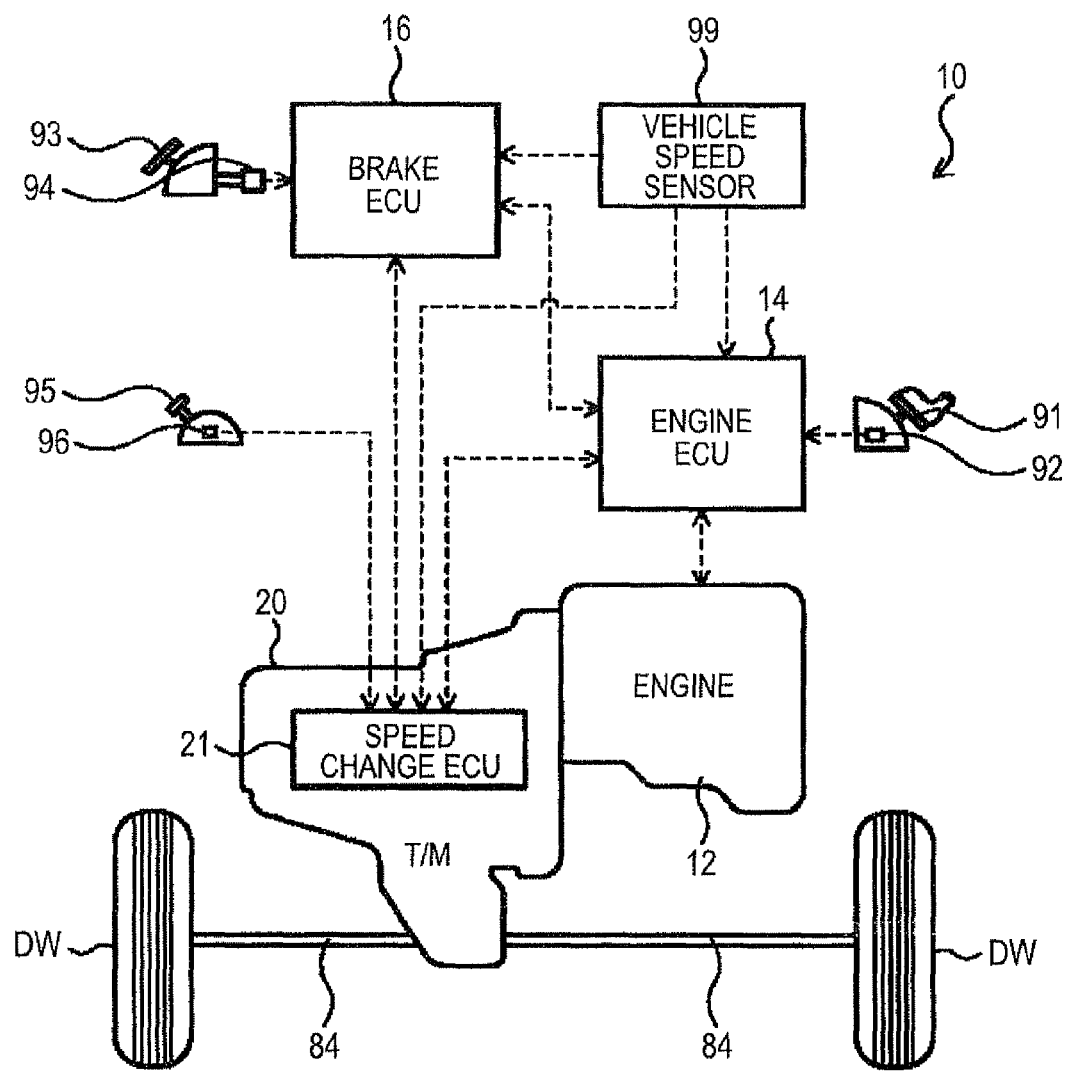
FIG. 1 is an outline configuration diagram of an automobile 10 which is a vehicle in which is mounted a power transmission device 20 including a transmission device according to a working example of the invention.
Figure 2:
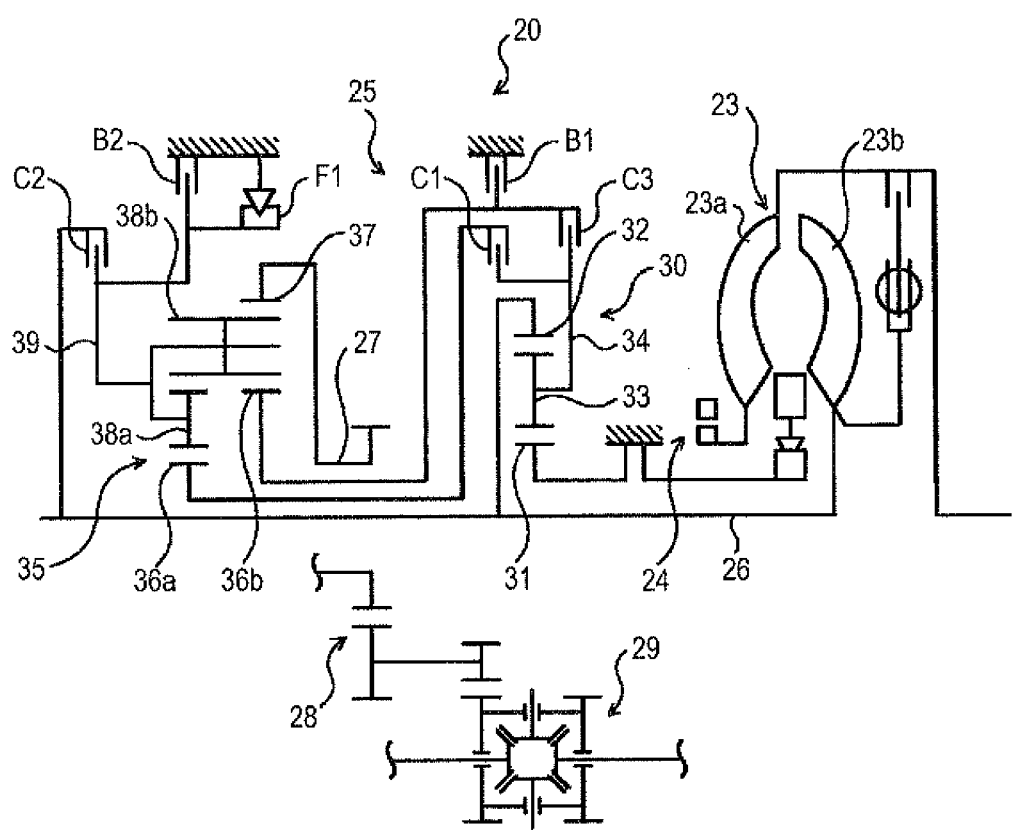
FIG. 2 is an outline configuration diagram of the power transmission device 20.

FIG. 1 is an outline configuration diagram of an automobile 10 which is a vehicle in which is mounted a power transmission device 20 including a transmission device according to one working example of the invention, and FIG. 2 is an outline configuration diagram of the power transmission device 20. The automobile 10 shown in these drawings includes an engine 12 as a power source which is an internal combustion engine which outputs power by a mixture of a hydrocarbon system fuel, such as gasoline or light oil, and air exploding and burning, an engine electronic control unit (hereafter referred to as an "engine ECU") 14 which controls the engine 12, a brake electronic control unit (hereafter referred to as a "brake ECU") 16 which controls an unshown electronic control type hydraulic brake unit, and the like. Also, the power transmission device 20, having a torque converter 23, a multi-speed automatic transmission 25, and a speed change electronic control unit (hereafter referred to as a "speed change ECU") 21 which controls the converter 23 and the automatic transmission 25, as well as being connected to a crankshaft of the engine 12, transmits the power from the engine 12 to left and right drive wheels DW.

As shown in FIG. 1, an accelerator position Acc from an accelerator pedal position sensor 92 which detects a depression amount (operation amount) of an accelerator pedal 91, a vehicle speed V from a vehicle speed sensor 99, signals from unshown various kinds of sensor, such as a rotation number sensor which detects a rotation number of the crankshaft, or the like, signals from the brake ECU 16 and speed change ECU 21, and the like, are input into the engine ECU 14, and the engine ECU 14, based on these signals, controls an electronic control type throttle valve, a fuel injection valve, a spark plug, and the like, none of which is shown in the drawing. A master cylinder pressure detected by a master cylinder pressure sensor 94 when a brake pedal 93 is depressed, the vehicle speed V from the vehicle speed sensor 99, the signals from the unshown various kinds of sensor or the like, the signals from the engine ECU 14 and speed change ECU 21, and the like, are input into the brake ECU 16, and the brake ECU 16, based on these signals, controls an unshown brake actuator (hydraulic actuator) and the like. The speed change ECU 21 of the power transmission device 20 is housed inside a transmission case. A shift range SR from a shift range sensor 96 which detects an operation position of a shift lever 95 for selecting a desired shift range from among a plurality of shift ranges, the vehicle speed V from the vehicle speed sensor 99, the signals from the unshown various kinds of sensor or the like, the signals from the engine ECU 14 and brake ECU 16, and the like, are input into the speed change ECU 21, and the speed change ECU 21, based on these signals, controls the torque converter 23, automatic transmission 25, and the like. Each of the engine ECU 14, brake ECU 16, and speed change ECU 21, being configured as a microcomputer centered on an unshown CPU, includes, apart from the CPU, an ROM which stores various kinds of program, an RAM which temporarily stores data, an input and output port, a communication port (none of which is shown in the drawing), and the like. Then, the engine ECU 14, the brake ECU 16 and speed change ECU 21 are connected to each other via a bus line, or the like, and an exchange of data necessary for the controls is executed between these ECU's as needed.

The power transmission device 20 includes the torque converter 23 housed inside the transmission case, an oil pump 24, the automatic transmission 25, a differential mechanism (a differential gear) 29, and the like. The torque converter 23 includes an input side pump impeller 23a connected to the crankshaft of the engine 12 and an output side turbine runner 23b connected to an input shaft 26 of the automatic transmission 25, and furthermore, has a lock-up clutch function. The oil pump 24 is configured as a gear pump including a pump assembly formed of a pump body and pump cover, and an externally toothed gear connected to the pump impeller 23a of the torque converter 23 via a hub. By the externally toothed gear being rotated by the power from the engine 12, hydraulic oil (ATF) stored in an oil pan (not shown) is suctioned by the oil pump 24, and pumped into an unshown hydraulic control unit. The hydraulic control unit, as well as generating hydraulic pressure required by the torque converter 23 and automatic transmission 25, supplies the hydraulic oil to lubrication portions such as various kinds of bearing.

The automatic transmission 25, being configured as a multi-speed transmission with six speeds, includes a single pinion planetary gear train 30, a Ravigneaux planetary gear train 35, three clutches C1, C2, and C3, and two brakes B1 and B2, which are for changing a power transmission path from the input side to the output side, and a one-way clutch F1, as shown in FIG. 2. The single pinion planetary gear train 30 has a sun gear 31 which is an externally toothed gear fixed to the transmission case, a ring gear 32 which is an internally toothed gear which, as well as being disposed concentrically with the sun gear 31, is connected to the input shaft 26, a plurality of pinion gears 33 which, as well as mating with the sun gear 31, mate with the ring gear 32, and a carrier 34 which rotatably and revolvably holds the plurality of pinion gears 33. The Ravigrieaux planetary gear train 35 has two sun gears 36a and 36b which are externally toothed gears, a ring gear 37 which is an internally toothed gear fixed to the output shaft 27 of the automatic transmission 25, a plurality of short pinion gears 38a mating with the sun gear 36a, a plurality of long pinion gears 38b which, as well as mating with the sun gear 36b and plurality of short pinion gears 38a, mate with the ring gear 37, and a carrier 39 which, as well as rotatably and revolvably holding the plurality of short pinion gears 38a and plurality of long pinion gears 38b, linked to each other, is supported on the case via the one-way clutch F1. Then, the output shaft 27 of the automatic transmission 25 is connected to the drive wheels DW via a gear mechanism 28 and the differential mechanism 29.

Figure 4:
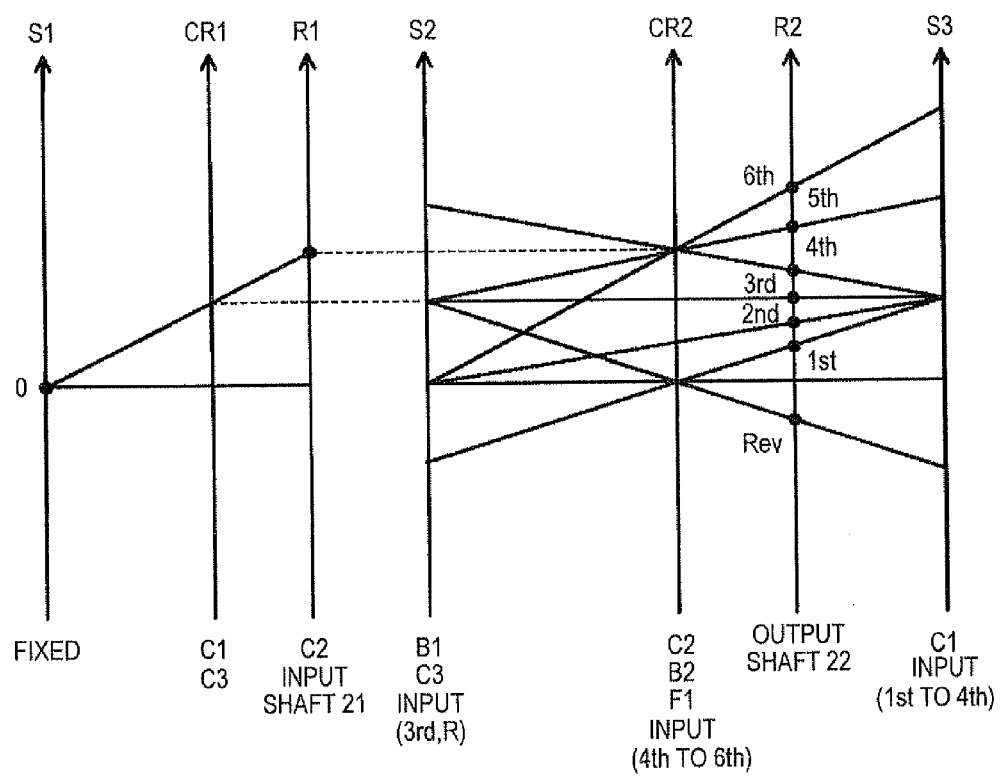
FIG. 4 is a collinear diagram illustrating a relationship in rotation speed between rotational elements configuring the automatic transmission 25.

The clutch C1 is a hydraulic clutch including a hydraulic servo which can fasten the carrier 34 of the single pinion planetary gear train 30 and the sun gear 36a of the Ravigneaux planetary gear train 35, and release the fastening. The clutch C2 is a hydraulic clutch including a hydraulic servo which can fasten the input shaft 26 and the carrier 39 of the Ravigneaux planetary gear train 35, and release the fastening. The clutch C3 is a hydraulic clutch including a hydraulic servo which can fasten the carrier 34 of the single pinion planetary gear train 30 and the sun gear 36b of the Ravigneaux planetary gear train 35, and release the fastening. The brake B1 is a hydraulic brake including a hydraulic servo which can fix the sun gear 36b of the Ravigneaux planetary gear train 35 to the case, and release the fixation of the sun gear 36b to the case. The brake B2 is a hydraulic brake including a hydraulic servo which can fix the carrier 39 of the Ravigneaux planetary gear train 35 to the case, and release the fixation of the carrier 39 to the case. These clutches C1 to C3 and brakes B1 and B2 act on receiving a supply and discharge of hydraulic oil by the hydraulic control unit. FIG. 3 shows an operation table representing a relationship between each speed of the automatic transmission 25 and the operation conditions of the clutches C1 to C3 and brakes B1 and B2, and FIG. 4 is a collinear diagram illustrating a relationship in rotation speed between the rotational elements configuring the automatic transmission 25. The automatic transmission 25 provides forward first to sixth speeds and one reverse speed by putting the clutches C1 to C3 and brakes E1 and B2 into the conditions shown in the operation table of FIG. 3.

Next, a description will be given of a speed change action of the automatic transmission 25.

Figure 5:
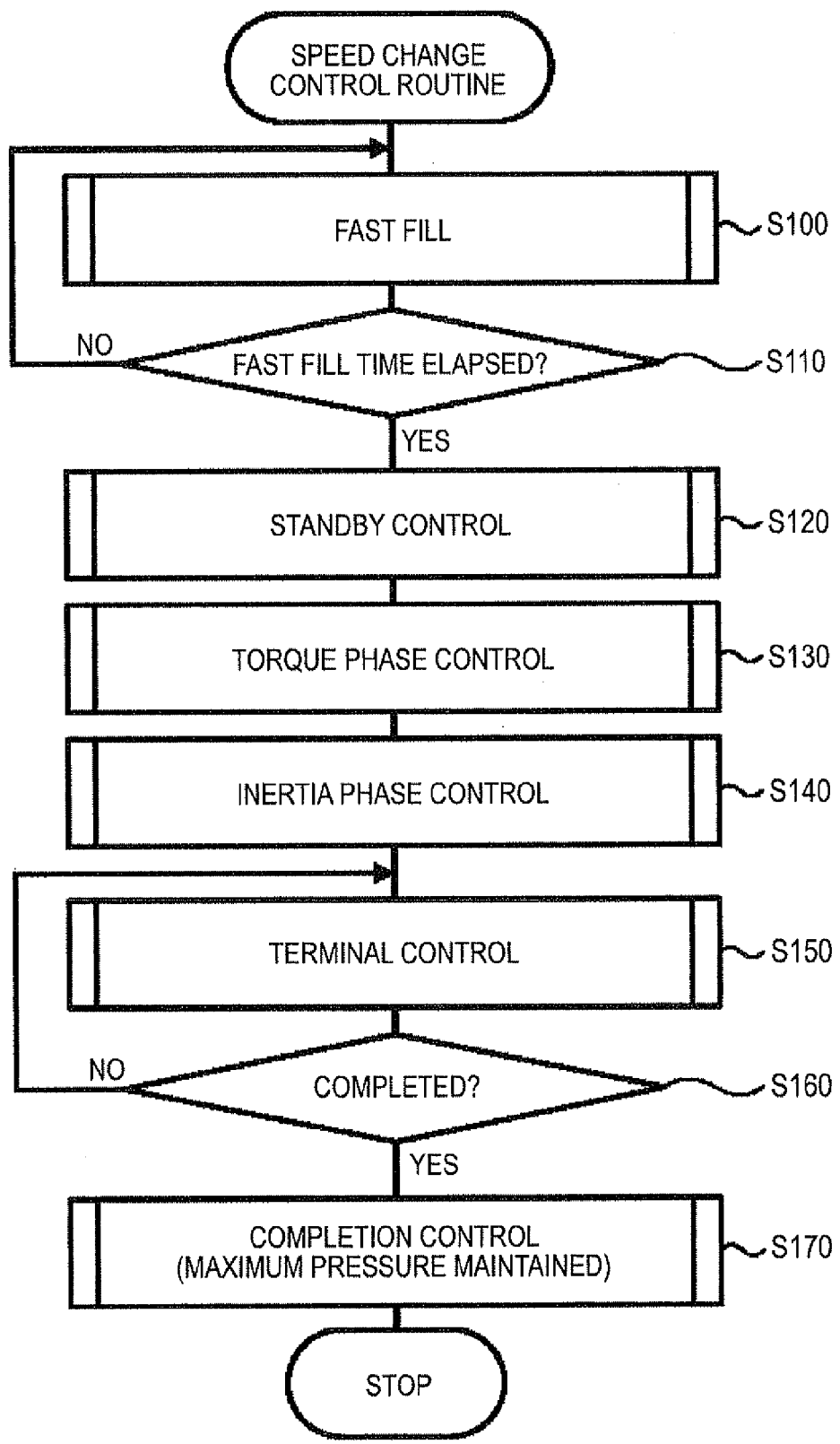
FIG. 5 is a flowchart showing an example of a speed change control routine.

FIG. 5 is a flowchart showing an example of a speed change control routine executed by the speed change ECU 21 when changing a speed of the automatic transmission 25 to an upshift side in an accelerator on condition in which the accelerator pedal 91 is depressed by a driver. Herein, the speed change control routine will be described with a case in which the clutch C3 acting as an engagement side frictional engagement element is engaged in accordance with a command to upshift from the forward second speed to the forward third speed taken as an example. When upshifting from the forward second speed to the forward third speed, another unshown speed change control routine for releasing the engagement of the brake B1 (a release side frictional engagement element) engaged when setting the forward second speed is also executed by the speed change ECU 21. Also, a determination of whether or not to change the speed to the upshift side is executed by the speed change ECU 21 based on the acceleration position Acc from the acceleration pedal position sensor 92, the vehicle speed V from the vehicle speed sensor 99, and the like.

When starting the speed change control routine of FIG. 5, the speed change ECU 21 (unshown CPU), firstly, executes a fast fill control (a filling control) (step S100). The fast fill control is such that a linear solenoid valve corresponding to the clutch C3, included in the hydraulic control unit, is driven and controlled at a comparatively high duty ratio in such a way that the hydraulic servo (hydraulic cylinder) of the clutch C3 is rapidly filled with hydraulic oil so that the clutch C3 attains a condition immediately before it is engaged. Such a fast fill control is executed for a preset fast fill time tff, and when it is determined that the fast fill time tff has elapsed from the start of the fast fill control (step S110), the speed change ECU 21 executes a standby control (step S120). The standby control is such that the hydraulic control unit (the linear solenoid valve corresponding to the clutch C3) is controlled in such a way that, as well as hydraulic pressure for the hydraulic servo of the clutch C3 dropping to a preset comparatively low standby pressure in a predetermined gradient so as not to cause a rotational change of the input shaft 26, the hydraulic pressure for the hydraulic servo of the clutch C3 is maintained at the standby pressure for a predetermined time (step S120).

Next, the speed change ECU 21 sequentially executes a torque phase control (step S130), an inertia phase control (step S140), and a terminal control (step S150). When the torque phase control in step S150 is started, firstly, a target pressure immediately before the rotational change of the input shaft 26 is started (immediately before an inertia phase start) is calculated using an input torque for the input shaft 26 and a predetermined function, and the hydraulic control unit (the linear solenoid valve corresponding to the clutch C3) is controlled in such a way that the hydraulic pressure for the hydraulic servo of the clutch C3 rises to the target pressure in a comparatively gentle gradient. Then, when the hydraulic pressure for the hydraulic servo of the clutch C3 reaches the target pressure, a gradient corresponding to a target rotational change rate when the rotational change of the input shaft 26 is started is calculated, and the hydraulic control unit (the linear solenoid valve corresponding to the clutch C3) is controlled in such a way that the hydraulic pressure for the hydraulic servo of the clutch C3 rises in the calculated gradient.

When the torque phase control is completed and the inertia phase control in step S140 is started, firstly, a gradient is calculated in accordance with a relational expression of a feed back control based on an amount of change in the rotation speed of the input shaft 26, and the hydraulic control unit (the linear solenoid valve corresponding to the clutch C3) is controlled in such a way that the hydraulic pressure for the hydraulic servo of the clutch C3 rises in the calculated gradient. Then, the inertia phase control is completed at a stage at which the rotation speed of the input shaft 26 has changed by, for example, around 70% of a difference between a rotation speed corresponding to the speed (second speed) before the speed change and a rotation speed corresponding to the speed (third speed) after the speed change, and the terminal control (step S150) is started. The terminal control in step S150, being such that the hydraulic control unit (the linear solenoid valve corresponding to the clutch C3) is controlled in such a way that the hydraulic pressure for the hydraulic servo of the clutch C3 rises in a gradient gentler than the gradient in the inertia phase control, finishes at a stage at which it is determined in step S160 that, for example, a gear ratio based on the rotation speed of the input shaft 26 and the rotation speed of the output shaft 27 has largely coincided with a gear ratio based on the target speed.

At the stage at which it is determined instep S160 that the terminal control (a clutch C3 engagement process) has finished, it can be assumed that the gear ratio based on the rotation speed of the input shaft 26 and the rotation speed of the output shaft 27 has largely coincided with the gear ratio based on the target speed (third speed), and that the clutch C3 has come into complete engagement, and subsequently, a completion control (step S170) is executed. The completion control in step S170 is such that the hydraulic pressure for the hydraulic servo of the clutch C3 rises steeply to a maximum pressure (a line pressure PL) within a predetermined time, and the hydraulic pressure of the clutch C3 is maintained at the maximum pressure. In this way, a condition is attained in which the line pressure PL is supplied to the hydraulic servo of the clutch C3, and when the condition is maintained, this routine finishes. In the accelerator on condition, at the time of an upshift speed change from the forward first speed to the forward second speed, an upshift speed change from the forward third speed to the forward fourth speed, an upshift speed change from the forward fourth speed to the forward fifth speed, or an upshift speed change from the forward fifth speed to the forward sixth speed, a control to release the engagement of the clutch or brake engaged so far is executed as necessary together with a speed change control the same as the heretofore described one.

Figure 6:
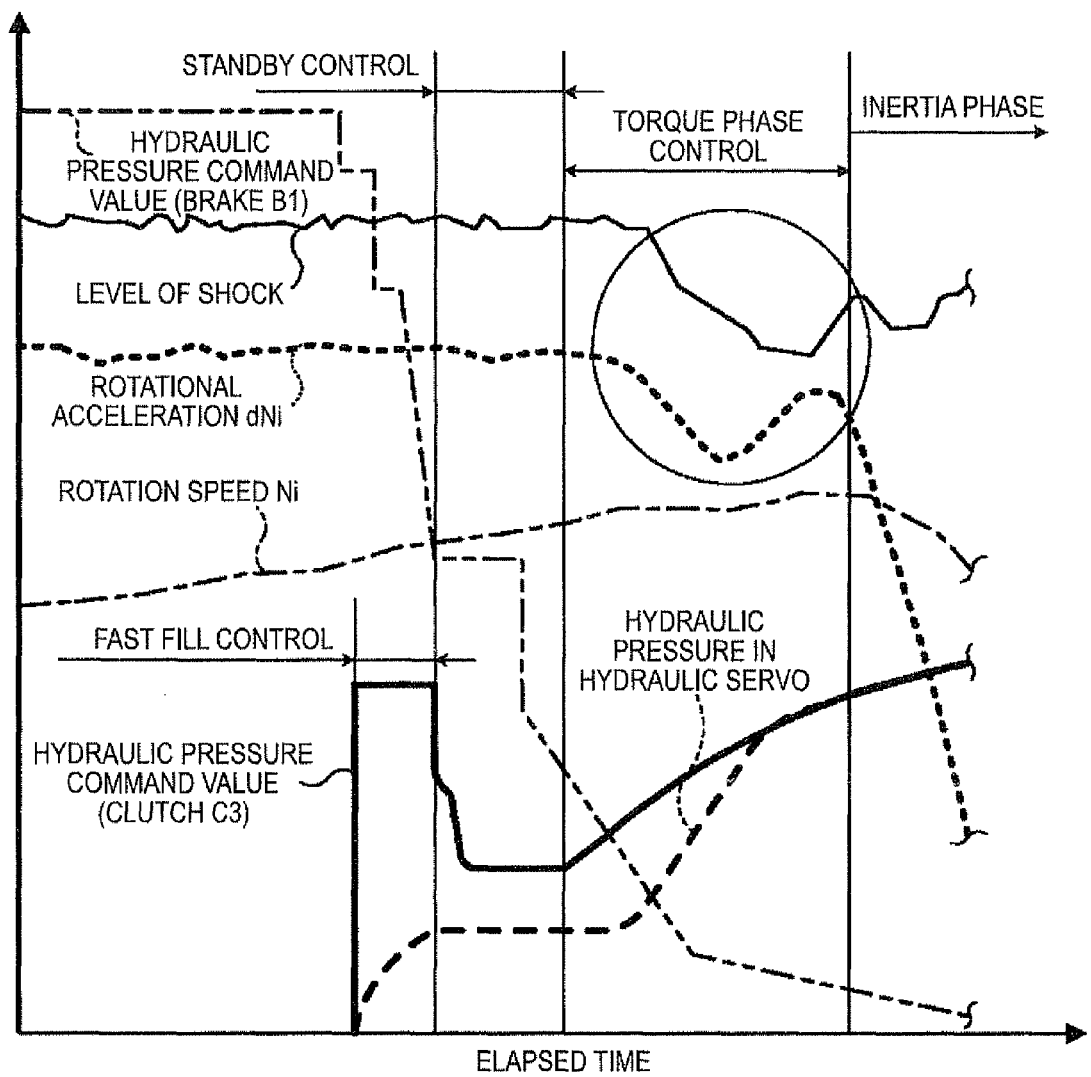
FIG. 6 is a time chart illustrating a condition in which a hydraulic pressure command value for a linear solenoid valve corresponding to a clutch C3, hydraulic pressure in a hydraulic servo of the clutch C3, a rotation speed Ni of an input shaft 26, a rotational acceleration dNi of the input shaft 26, and the level of a shock detected by a G sensor, change when upshifting the automatic transmission 25 from a forward second speed to a forward third speed by switching a brake B1 from an engaged condition to a released condition, and switching the clutch C3 from a released condition to an engaged condition.

The heretofore described filling control and standby control are executed in order to bring a clutch or brake (an engagement side frictional engagement element), which is switched from a released condition to an engaged condition when upshifting the speed in the accelerator on condition, into gentle engagement without causing an engagement shock during the standby control or early in a torque phase, and provide the engagement side frictional engagement element with torque capacity. Herein, for example, when the torque phase control is executed with a start of engagement of the clutch C3 remaining delayed when upshifting from the forward second speed to the forward third speed in the accelerator on condition, as shown by the broken line in FIG. 6, a filling of the hydraulic servo of the clutch C3 with hydraulic oil is carried out early in the torque phase, and when the filling of the relevant hydraulic servo with hydraulic oil is completed (when the engagement side frictional engagement element attains a condition immediately before it is engaged), the hydraulic pressure in the hydraulic servo increases sharply, due to which the engagement side frictional engagement element is rapidly engaged, causing an engagement shock (refer to the circled portion in FIG. 6). Also, when the engagement of an engagement side frictional engagement element is started when upshifting the speed in the accelerator on condition, the engagement side frictional engagement element has torque capacity, due to which a fluctuation (a temporary reduction, hereafter, this fluctuation will be referred to as a "decrement in a rotational acceleration dNi of the input shaft 26" as appropriate) occurs in the rotational acceleration (a per unit time amount of change in rotation speed) dNi of the input shaft 26. Then, for example, the more rapidly the clutch C3 is engaged in the torque phase when upshifting from the forward second speed to the forward third speed in the accelerator on condition, the larger a fluctuation in the rotational acceleration dNi of the input shaft 26 accompanying the start of engagement of the clutch C3 becomes due to a tie-up between the clutch C3 and release side brake B1 (refer to the circled portion in FIG. 6). Furthermore, a sudden change in the rotational acceleration dNi of the input shaft 26 caused by this kind of rapid engagement of the engagement side frictional engagement element in the torque phase also occurs in the same way when the one-way clutch assumes the role of the release side engagement element before the speed is upshifted in the accelerator on condition. For this reason, in the automatic transmission 25 of the working example, in order to effectively resolve the delay in the start of engagement of the engagement side frictional engagement element, the fast fill time correction routine shown in FIG. 7 is executed by the speed change ECU 21, in order to appropriately learn and correct a fast fill time which is a fast fill control execution time set for the clutch C3 after the speed change control routine of FIG. 5 has been executed on an engagement side frictional engagement element, by the time the speed change control routine of FIG. 5 is executed again on the engagement side frictional engagement element.

Continuing, a description will be given, while referring to FIG. 7, of the fast fill time correction routine. Herein, a description will be given of a fast fill time correction routine carried out after (for example, immediately after) the speed change control routine of FIG. 5 has been executed for the clutch C3 when upshifting from the forward second speed to the forward third speed.

Figure 7:
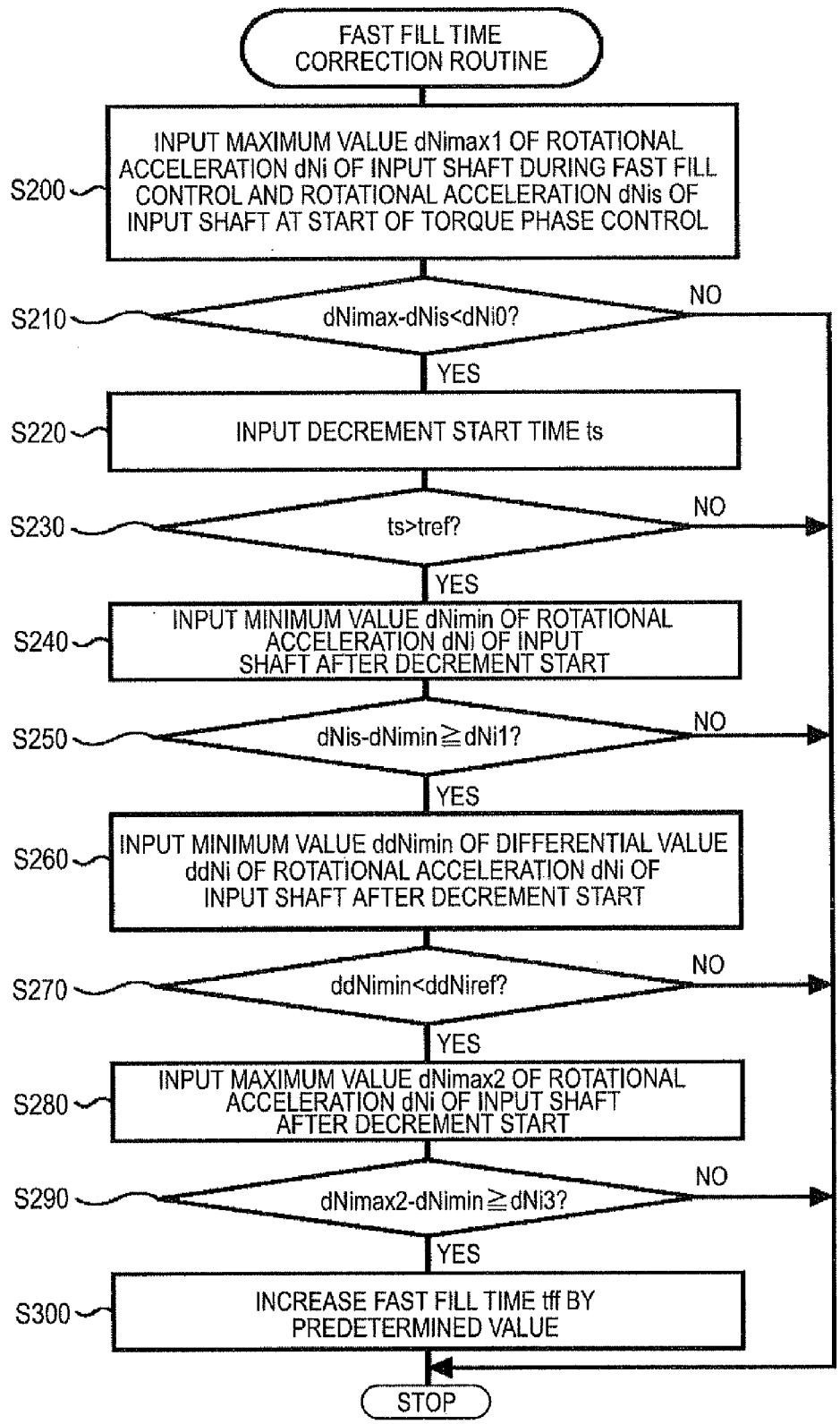
FIG. 7 is a flowchart showing an example of a fast fill time correction routine.

When starting the fast fill time correction routine of FIG. 7, the speed change ECU 21 (unshown CPU), firstly, inputs a maximum value dNimax1 of the rotational acceleration dNi of the input shaft 26 during the latest fast fill control for the clutch C3 and a rotational acceleration dNis of the input shaft 26 at the start of the latest torque phase control for the clutch C3 (step S200). Both the maximum value dNimax1 of the rotational acceleration dNi of the input shaft 26 and the rotational acceleration dNis of the input shaft 26, input in step S200, are calculated by the speed change ECU 21 based on a detection value of an unshown rotational position detection sensor provided on the input shaft 26 of the automatic transmission 25, and held by the RAM of the speed change ECU 21, when the latest speed change control routine (fast fill control and torque phase control) for the clutch C3 is executed.

On inputting the maximum value dNimax1 of the rotational acceleration dNi of the input shaft 26 during the latest fast fill control and the rotational acceleration dNis of the input shaft 26 at the start of the torque phase control, the speed change ECU 21 determines whether or not a value obtained by subtracting the rotational acceleration dNis from the maximum value dNimax1 is less than a threshold value dNi0 (a fourth threshold value) preset through an experiment and analysis (step S210). Herein, in the event that the clutch C3 is not engaged during the execution of the latest standby control, no heretofore described kind of decrement in the rotational acceleration dNi of the input shaft 26 occurs, and moreover, the rotation speed Ni of the input shaft 26 barely changes from the start of the fast fill control until the finish of the standby control, meaning that a difference between the maximum value dNimax1 of the rotational acceleration dNi of the input shaft 26 during the fast fill control and the rotational acceleration dNis of the input shaft 26 at the start of the torque phase control is comparatively small. As opposed to this, when the clutch C3 is engaged during the execution of the latest standby control, the decrement in the rotational acceleration dNi of the input shaft 26 occurs, as heretofore described, meaning that the rotational acceleration dNis of the input shaft 26 at the start of the torque phase control is smaller than the maximum value dNimax1 of the rotational acceleration dNi of the input shaft 26 during the fast fill control, and the value (dNimax1−dNis) calculated in step S210 is a positive value with a certain level of absolute value. In light of this, in the working example, the threshold value dNi0 used in step S210 is preset through an experiment and analysis as an amount of fluctuation in the rotational acceleration dNi of the input shaft 26 caused when the clutch C3 is engaged by the time of the finish of the standby control after the start of the fast fill control. Consequently, in step S210, in the event that the value (dNimax1−dNis) is equal to or greater than the threshold value dNi0, it is determined that the clutch C3 which is the engagement side frictional engagement element has been engaged during the latest standby control, and the fluctuation, that is, the decrement, in the rotational acceleration dNi of the input shaft 26 has occurred. Then, in the event that the value (dNimax1−dNis) is equal to or greater than the threshold value dNi0, the speed change ECU 21 assumes that no delay occurs in the start of engagement of the clutch C3, and finishes this routine without correcting the fast fill time tff.

Also, in the event that it is determined in step S210 that the value (dNimax1−dNis) is less than the threshold value dNi0, and that the clutch C3 which is the engagement side frictional engagement element has not been engaged during the latest standby control, the speed change ECU 21 inputs a decrement start time ts stored in the RAM (step S220). The decrement start time ts, being measured when the latest speed change control routine (torque phase control) for the clutch C3 is executed, indicates a time from the latest torque phase control being started until the rotational acceleration dNi of the input shaft 26 exceeds a predetermined amount β, that is, until the rotational acceleration dNi of the input shaft 26 is less than a value (dNis−β). The predetermined amount β used in step S220 is preset through an experiment and analysis as the amount of fluctuation in the rotational acceleration dNi of the input shaft 26 caused when the clutch C3 is engaged in the torque phase.

The speed change ECU 21, on inputting the decrement start time ts, determines whether or not the input decrement start time ts is over a preset reference time tref (step S230). In this way, by checking a time needed for the rotational acceleration dNi of the input shaft 26 to change by the predetermined amount β after the start of the latest torque phase control, it is possible to more appropriately determine whether or not the shock has occurred accompanying a fluctuation in the rotational acceleration dNi of the input shaft 26 caused by the start of engagement of the clutch C3 during the execution of the relevant torque phase control. Then, as there is comparatively less fear of an occurrence of the shock even in the event that the clutch C3 is engaged comparatively early in the torque phase, when the decrement start time ts is equal to or less than the reference time tref the speed change ECU 21 finishes this routine without correcting the fast fill time tff. Because of this, it is possible to prevent the clutch C3 being rapidly engaged when executing the next fast fill control and standby control due to overcorrecting the fast fill time tff to an increment side.

Also, in the event that it is determined in step S230 that the decrement start time ts is over the reference time tref, and that there is fear that the shock has occurred during the execution of the latest torque phase control accompanying the fluctuation in the rotational acceleration dNi of the input shaft 26 caused by the start of engagement of the clutch C3, the speed change ECU 21 inputs a minimum value dNimin of the rotational acceleration dNi of the input shaft 26 in a period from the amount of change in the rotational acceleration dNi of the input shaft 26 exceeding the predetermined amount β after the latest torque phase control has been started (from a point at which the decrement start time ts has elapsed from the start of the latest torque phase control) until the relevant torque phase control finishes (step S240). The minimum value dNimin is also calculated by the speed change ECU 21 based on the detection value of the unshown rotational position detection sensor provided on the input shaft 26 of the automatic transmission 25, and held by the RAM of the speed change ECU 21, when the latest speed change control routine (torque phase control) for the clutch C3 is executed.

After the process of step S240, the speed change ECU 21 determines whether or not a value (dNis−dNimin) obtained by subtracting the minimum value dNimin input in step S240 from the rotational acceleration dNis of the input shaft 26 at the start of the latest torque phase control, input in step S200, is equal to or greater than a threshold value dNi1 (a first threshold value) preset through an experiment and analysis (step S250). Herein, the value (dNis−dNimin) calculated in step S250 indicates an amount of change in the rotational acceleration dNis from the torque phase control being started until the rotational acceleration dNis of the input shaft 26 is minimized due to the fluctuation in the rotational acceleration dNi of the input shaft 26 caused by the start of engagement of the clutch C3. Consequently, by comparing the value (dNis−dNimin) and the threshold value dNi1, it is possible to more accurately comprehend the size (degree) of a fluctuation in the rotational acceleration dNi of the input shaft 26 caused by the start of engagement of the clutch C3 after the start of the torque phase control. Then, in the event that the value (dNis−dNimin) is less than the threshold value dNi1, the speed change ECU 21 assumes that the fluctuation in the rotational acceleration dNi of the input shaft 26 caused by the start of engagement of the clutch C3 after the start of the latest torque phase control is comparatively small, and finishes this routine without correcting the fast fill time tff. Because of this, it is possible to prevent the clutch C3 being rapidly engaged when executing the next fast fill control and standby control due to overcorrecting the fast fill time tff to the increment side.

Also, in the event that it is determined in step S250 that the value (dNis−dNimin) is equal to or greater than the threshold value dNi1 preset through an experiment and analysis, and that the fluctuation in the rotational acceleration dNi of the input shaft 26 caused by the start of engagement of the clutch C3 after the start of the latest torque phase control is comparatively large, the speed change ECU 21 inputs a minimum value ddNimin of a per unit time amount of change (a differential value) ddNi in the rotational acceleration dNi of the input shaft 26 in the period from the amount of change in the rotational acceleration dNi of the input shaft 26 exceeding the predetermined amount β after the latest torque phase control has been started (from the point at which the decrement start time is has elapsed from the start of the latest torque phase control) until the relevant torque phase control finishes (step S260). The minimum value ddNimin is also calculated by the speed change ECU 21 based on the detection value of the unshown rotational position detection sensor provided on the input shaft 26 of the automatic transmission 25, and held by the RAM of the speed change ECU 21, when the latest speed change control routine (torque phase control) for the clutch C3 is executed.

After the process of step S260, the speed change ECU 21 determines whether or not the input minimum value ddNimin is less than a threshold value ddNiref (a negative value: a second threshold value) preset through an experiment and analysis (step S270). Herein, when the clutch C3 is engaged after the start of the latest torque phase control, the per unit time amount of change ddNi in the rotational acceleration dNi increases to a negative side due to a drop in the rotational acceleration dNi of the input shaft 26. Consequently, by comparing the minimum value ddNimin of the per unit time amount of change ddNi in the rotational acceleration dNi and the threshold value ddNiref, it is possible to more accurately comprehend the steepness (degree) of the rotational acceleration dNi of the input shaft 26 caused by the start of engagement of the clutch C3 after the start of the torque phase control. Then, in the event that the minimum value ddNimin of the per unit time amount of change ddNi in the rotational acceleration dNi is less than the threshold value ddNiref, the speed change ECU 21 assumes that the fluctuation in the rotational acceleration dNi of the input shaft 26 caused by the start of engagement of the clutch C3 after the start of the latest torque phase control is not steep, and finishes this routine without correcting the fast fill time tff. Because of this, it is possible to prevent the clutch C3 being rapidly engaged when executing the next fast fill control and standby control due to overcorrecting the fast fill time tff to the increment side.

Also, in the event that it is determined in step S270 that the minimum value ddNimin is less than the threshold value ddNiref, and that the fluctuation in the rotational acceleration dNi of the input shaft 26 caused by the start of engagement of the clutch C3 after the start of the latest torque phase control is comparatively steep, the speed change ECU 21 inputs a maximum value dNimax2 of the rotational acceleration dNi of the input shaft 26 in a period from the minimum value dNimin of the rotational acceleration dNi of the input shaft 26 being detected after the latest torque phase control has been started until the relevant torque phase control finishes (step S280). The maximum value dNimax2 is also calculated by the speed change ECU 21 based on the detection value of the unshown rotational position detection sensor provided on the input shaft 26 of the automatic transmission 25, and held by the RAM of the speed change ECU 21, when the latest speed change control routine (torque phase control) for the clutch C3 is executed.

After the process of step S280, the speed change ECU 21 determines whether or not a value (dNimax2−dNimin) obtained by subtracting the minimum value dNimin input in step S240 from the input maximum value dNimax2 is equal to or greater than a threshold value dNi3 (a third threshold value) preset through an experiment and analysis (step S290). Herein, the value (dNimax2−dNimin) calculated in step S280 indicates an amount of change (a recovery) in the rotational acceleration dNi of the input shaft 26 accompanying a conclusion of the fluctuation in the rotational acceleration dNi of the input shaft 26 caused by the start of engagement of the clutch C3 after the start of the torque phase control. Consequently, by comparing the value (dNimax2−dNimin) and the threshold value dNi3, it is possible to more accurately comprehend the size (degree) of the recovery. Then, in the event that the value (dNimax2−dNimin) is less than the threshold value dNi3, the speed change ECU 21 assumes that the recovery from the fluctuation in the rotational acceleration dNi of the input shaft 26 caused by the start of engagement of the clutch C3 after the start of the latest torque phase control is comparatively small, and finishes this routine without correcting the fast fill time tff. Because of this, it is possible to prevent the clutch C3 being rapidly engaged when executing the next fast fill control and standby control due to overcorrecting the fast fill time tff to the increment side.

Figure 8:
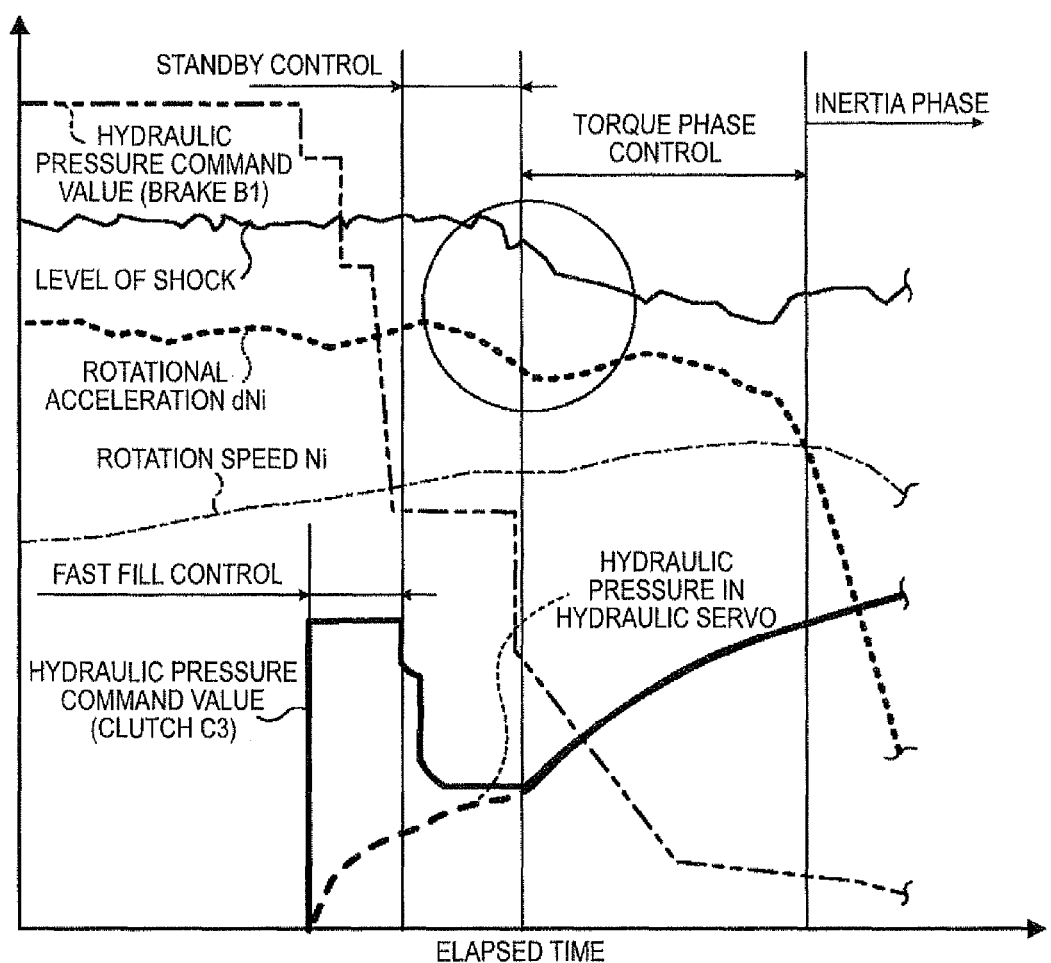
FIG. 8 is a time chart illustrating a condition in which the hydraulic pressure command value for the linear solenoid valve corresponding to the clutch C3, the hydraulic pressure in the hydraulic servo of the clutch C3, the rotation speed Ni of the input shaft 26, the rotational acceleration dNi of the input shaft 26, and the level of the shock detected by the G sensor, change when upshifting the automatic transmission 25 from the forward second speed to the forward third speed by switching the brake B1 from the engaged condition to the released condition, and switching the clutch C3 from the released condition to the engaged condition, after the fast fill time correction routine of FIG. 7 has been executed.

As opposed to this, in the event that it is determined in step S290 that the difference between the maximum value dNimax2 and minimum value dNimin of the rotational acceleration dNi of the input shaft 26 is equal to or greater than the threshold value dNi3, that is, in the event that an affirmative determination is made in all the heretofore described steps S210, S230, S250, S270, and S290, the fast fill time tff is corrected to the increment side (an extension side) by a preset time (for example, around 10 to 20 mSec) for the clutch C3, and this routine is finished. That is, in the working example, when the clutch C3 acting as the engagement side frictional engagement element is not engaged while the latest standby control is executed, a fluctuation in the rotational acceleration dNi of the input shaft 26 caused by the start of engagement (a start of torque capacity acquisition) of the clutch C3 occurs during the execution of the latest torque phase control, and a fluctuation in the rotational acceleration dNi of the input shaft 26 exceeding the degree based on the threshold values dNi1, ddNiref, and dNi3 acting as preset determination references is detected after the latest standby control, the fast fill time which is the fast fill control execution time is corrected to the increment side. Because of this, once the fluctuation in the rotational acceleration dNi of the input shaft 26 exceeding the preset determination reference is detected after the standby control for the clutch C3, as shown in the circled portion in FIG. 6, the fast fill time tff for the clutch C3 is corrected in such a way that the filling of the hydraulic servo with hydraulic oil is prompted by the time of the start of the torque phase control, and after that, that is, when executing the next speed change control routine for the clutch C3, it is possible to effectively resolve the delay in the start of engagement of the clutch C3, as shown in the circled portion in FIG. 8. As a result of this, it is possible to effectively suppress the shock caused by the rapid engagement of the clutch C3 during the execution of the torque phase control, and smoothly execute the torque phase control, and the like, subsequent to the standby control while causing the hydraulic pressure in the clutch C3 to effectively follow an hydraulic pressure command value, as shown in FIG. 8.

Figure 9:
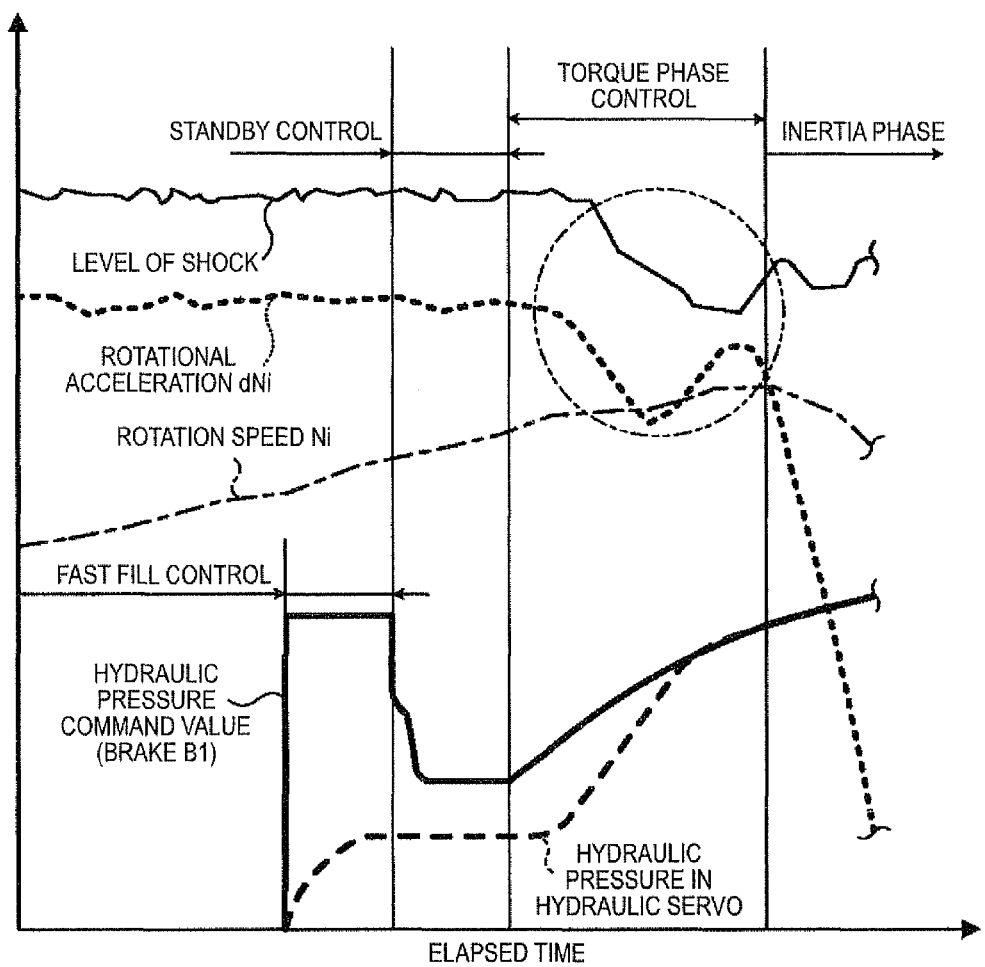
FIG. 9 is a time chart illustrating a condition in which an hydraulic pressure command value for a linear solenoid valve corresponding to the brake B1, hydraulic pressure in a hydraulic servo of the brake B1, the rotation speed Ni of the input shaft 26, the rotational acceleration dNi of the input shaft 26, and the level of the shock detected by the G sensor, change when upshifting the automatic transmission 25 from a forward first speed to the forward second speed by switching the brake B1 from the released condition to the engaged condition.
Figure 10:
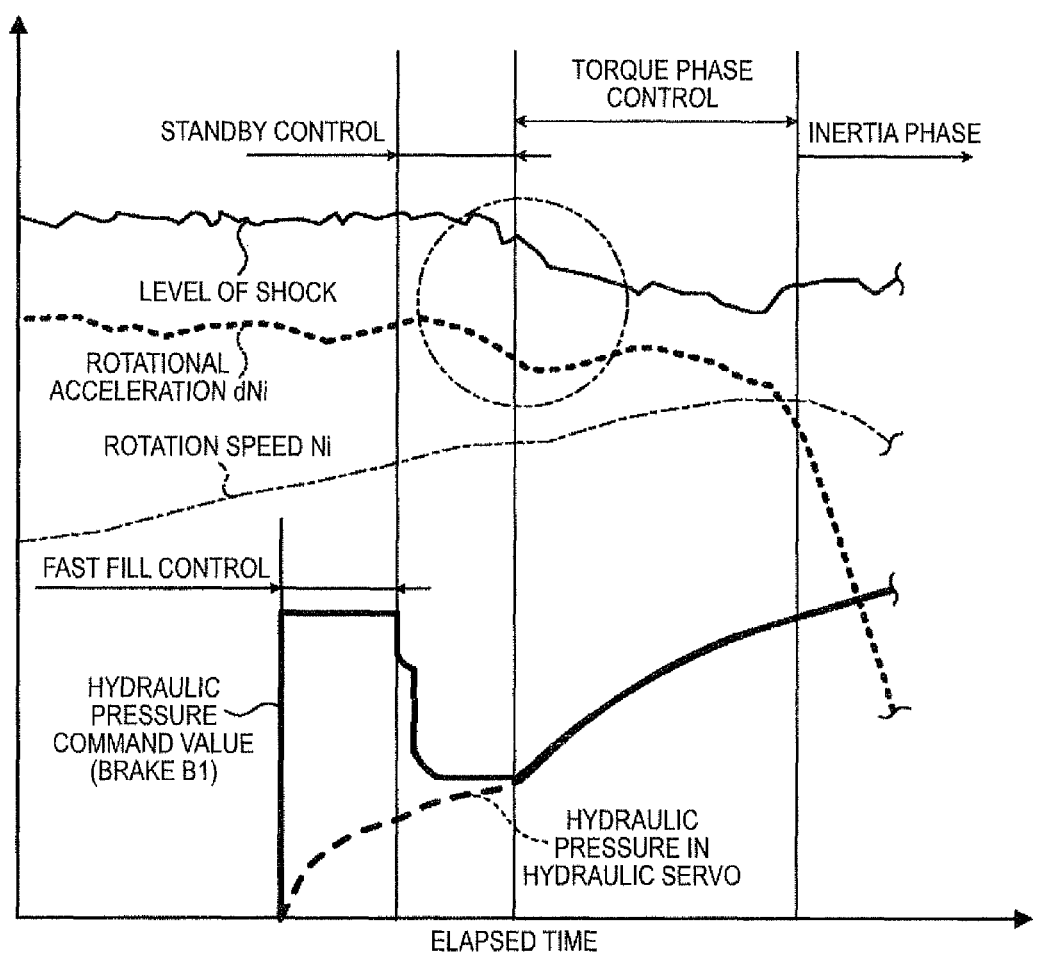
FIG. 10 is a time chart illustrating a condition in which the hydraulic pressure command value for the linear solenoid valve corresponding to the brake B1, the hydraulic pressure in the hydraulic servo of the brake B1, the rotation speed Ni of the input shaft 26, the rotational acceleration dNi of the input shaft 26, and the level of the shock detected by the G sensor, change when upshifting the automatic transmission 25 from the forward first speed to the forward second speed by switching the brake B1 from the released condition to the engaged condition after the fast fill time correction routine of FIG. 7 has been executed.

Furthermore, the heretofore described fast fill time correction routine is also very effective when the one-way clutch assumes the role of a release side engagement element before the speed is upshifted in the accelerator on condition. For example, in the event that the heretofore described fast fill time correction routine is executed after the speed change control routine of FIG. 5 has been executed for the brake B1 when upshifting from the forward first speed to the forward second speed in the accelerator on condition, once the fluctuation in the rotational acceleration dNi of the input shaft 26 exceeding the preset determination reference after the standby control for the brake B1 is detected, as shown in the circled portion in FIG. 9, the first fill time tff for the brake B1 is corrected in such a way that the filling of the hydraulic servo with hydraulic oil is prompted by the time of the start of the torque phase control, and after that, that is, when executing the next speed change control routine for the brake B1, it is possible to effectively resolve a delay in the start of engagement of the brake B1, as shown in the circled portion in FIG. 10. As a result of this, it is possible to effectively suppress a shock caused by a rapid engagement of the brake B1 during the execution of the torque phase control, and smoothly execute the torque phase control, and the like, subsequent to the standby control while causing the hydraulic pressure in the brake B1 to effectively follow the hydraulic pressure command value, as shown in FIG. 10.

As heretofore described, with the automatic transmission 25 of the working example, when upshifting the speed in the accelerator on condition by switching an engagement side frictional engagement element, such as the clutch C3, from the released condition to the engaged condition, an engagement control including the torque phase control, inertia phase control, and the like, is executed after the execution of the fast fill control which controls the hydraulic control unit in such a way that the hydraulic servo of the engagement side frictional engagement element is filled with hydraulic oil, and the standby control which controls the hydraulic control unit in such a way that the hydraulic pressure for the hydraulic servo of the engagement side frictional engagement element is maintained at the preset standby pressure. Then, with the automatic transmission 25 of the working example, the fast fill time tff is corrected to the increment side when the fluctuation in the rotational acceleration dNi of the input shaft 26 exceeding the degree based on the threshold values dNi1, ddNiref, and dNi3 acting as the preset determination references is detected after the standby control (steps S240 to S300). Because of this, once the fluctuation in the rotational acceleration dNi of the input shaft 26 exceeding the preset determination reference is detected after the standby control for an engagement side frictional engagement element, the first fill time tff for the engagement side frictional engagement element is corrected in such a way that the filling of the hydraulic servo with hydraulic oil is prompted by the time of the start of the torque phase control, meaning that it is possible after that to effectively resolve the delay in the start of engagement of the relevant engagement side frictional engagement element, and furthermore, it is possible to effectively suppress the shock caused by the rapid engagement of the relevant engagement side frictional engagement element during the execution of the torque phase control. Then, such a control is very effective not only when the upshift of the speed is achieved by the engagement of the engagement side frictional engagement element and the release of another clutch or brake (a release side frictional engagement element), as when upshifting from the forward second speed to the forward third speed, accompanied by the engagement of the clutch C3 and the release of the brake B1, but also when the one-way clutch assumes the role of the release side frictional engagement element before the speed is upshifted in the accelerator on condition.

In the heretofore described working example, the fast fill time tff is corrected to the increment side only when an affirmative determination is made in all steps S250, S270, and S290 after an affirmative determination has been made in both steps S210 and S230, but this is not limiting. That is, the fast fill time tff may be corrected to the increment side when an affirmative determination is made in any one or two of steps S250, S270, and S290 after an affirmative determination has been made in both steps S210 and S230. Furthermore, in step S300, instead of correcting the fast fill time tff to the increment side in the way heretofore described, the standby pressure set by the standby control may be corrected to the increment side, and both the fast fill time tff and the standby pressure may be corrected.

Also, in the heretofore described working example, the fast fill time tff is corrected to the increment side on the condition that the value (dNis−dNimin) obtained by subtracting the minimum value dNimin of the rotational acceleration dNi of the input shaft 26 in the period from the amount of change in the rotational acceleration dNi of the input shaft 26 exceeding the predetermined amount β after the latest torque phase control has been started until the relevant torque phase control finishes from the rotational acceleration dNis of the input shaft 26 at the start of the relevant torque phase control is equal to or greater than the preset threshold value dNi1 (first threshold value) (steps S240, S250, and S300). Because of this, it is possible to more accurately comprehend the size of the fluctuation in the rotational acceleration dNi of the input shaft 26 caused by the start of engagement of an engagement side frictional engagement element such as the clutch C3 after the start of the latest torque phase control, and it is possible to appropriately determine the necessity or otherwise of the correction of the fast fill time tff based on the size of the relevant fluctuation in the rotational acceleration dNi of the input shaft 26. Then, by assuming that the fast fill time tff is not corrected to the increment side when the fluctuation in the rotational acceleration dNi of the input shaft 26 caused by the start of engagement of the engagement side frictional engagement element after the start of the latest torque phase control is comparatively small, it is possible to prevent the engagement side frictional engagement element being rapidly engaged during the execution of the next fast fill control and standby control due to overcorrecting the fast fill time tff, and the like, to the increment side.

Furthermore, in the heretofore described working example, the fast fill time tff is corrected to the increment side on the condition that the minimum value ddNimin of the per unit time amount of change ddNi in the rotational acceleration dNi of the input shaft 26 in the period from the amount of change in the rotational acceleration dNi of the input shaft 26 exceeding the predetermined amount β after the latest torque phase control has been started until the relevant torque phase control finishes is less than the predetermined threshold value ddNiref (second threshold value) (steps S260, S270, and S300). Because of this, it is possible to more accurately comprehend the steepness of the fluctuation in the rotational acceleration dNi of the input shaft 26 caused by the start of engagement of an engagement side frictional engagement element such as the clutch C3 after the start of the latest torque phase control, and it is possible to more appropriately determine the necessity or otherwise of the correction of the fast fill time tff based on the steepness of the relevant fluctuation in the rotational acceleration dNi of the input shaft 26. Then, by assuming that the fast fill time tff is not corrected to the increment side when the steepness of the fluctuation in the rotational acceleration dNi of the input shaft 26 caused by the start of engagement of the engagement side frictional engagement element after the start of the torque phase control is comparatively small, it is possible to prevent the engagement side frictional engagement element being rapidly engaged during the execution of the next fast fill control and standby control due to overcorrecting the fast fill time tff to the increment side.

Also, in the heretofore described working example, the fast fill time tff is corrected to the increment side on the condition that the difference (dNimax2−dNimin) between the minimum value dNimin of the rotational acceleration dNi of the input shaft 26 in the period from the amount of change in the rotational acceleration dNi of the input shaft 26 exceeding the predetermined amount β after the latest torque phase control has been started until the relevant torque phase control finishes and the maximum value dNimax2 of the rotational acceleration dNi of the input shaft 26 after the relevant minimum value has occurred is equal to or greater than the predetermined threshold value dNi3 (third threshold value) (steps S280, S290, and S300). Because of this, after more accurately comprehending the amount of change (recovery) in the rotational acceleration dNi of the input shaft 26 accompanying the conclusion of the fluctuation in the rotational acceleration dNi of the input shaft 26 caused by the start of engagement of the engagement side frictional engagement element after the start of the latest torque phase control, it is possible to more appropriately determine the necessity or otherwise of the correction of the fast fill time tff, and it is possible to prevent the fast fill time tff being overcorrected to the increment side.

Furthermore, in the heretofore described working example, the fast fill time tff is corrected to the increment side on the condition that the decrement start time is from the latest torque phase control being started until the amount of change in the rotational acceleration dNi of the input shaft 26 exceeds the predetermined amount β is equal to or greater than the reference time tref (steps S220, S230, and S300). In this way, by checking the decrement start time ts which is the time needed for the rotational acceleration dNi of the input shaft 26 to change by the predetermined amount β after the start of the latest torque phase control, it is possible to more appropriately determine whether or not a shock has occurred during the execution of the latest torque phase control accompanying the fluctuation in the rotational acceleration dNi of the input shaft 26 caused by the start of engagement of the engagement side frictional engagement element. Then, as there is comparatively less fear of an occurrence of the shock even in the event that the engagement side frictional engagement element is engaged comparatively early in the torque phase, by not correcting the fast fill time tff to the increment side when the decrement start time ts is less than the reference time tref, it is possible to prevent the engagement side frictional engagement element being rapidly engaged during the execution of the next fast fill control and standby control due to overcorrecting the fast fill time tff to the increment side. However, the determination process of step S230 may be omitted in the fast fill control routine of FIG. 7.

Also, in the heretofore described working example, when it is determined that the fluctuation in the rotational acceleration dNi of the input shaft 26 caused by the start of engagement of an engagement side frictional engagement element such as the clutch C3 has not occurred while the latest standby control is executed (step S210), it is determined whether or not the fluctuation in the rotational acceleration dNi of the input shaft 26 exceeding the degree based on the threshold values dNi1, ddNiref, and dNi3 acting as the preset determination references has been detected after the relevant standby control (steps S220 to S290). In this way, after confirming that the engagement side frictional engagement element is not engaged during the latest standby control, that is, by the time the latest torque phase control is started, by checking a fluctuation in the rotational acceleration dNi of the input shaft 26 after the relevant standby control, it is possible to more effectively prevent the engagement side frictional engagement element being rapidly engaged during the execution of the next fast fill control and standby control due to overcorrecting the fast fill time tff to the increment side. Then, by comparing the value (dNimax1−dNis), obtained by subtracting the rotational acceleration dNis of the input shaft 26 at the start of the latest torque phase control from the maximum value dNimax1 of the rotational acceleration dNi of the input shaft 26 while the latest fast fill control is executed, and the preset threshold value dNi0 (fourth threshold value), it is possible to more appropriately determine whether or not the engagement side frictional engagement element has been engaged while the latest standby control is executed. However, the determination process of step S210 may be omitted in the fast fill control routine of FIG. 7.

Herein, a description will be given of a correspondence relationship between the main elements of the working example and the main elements of the invention described in the section of DISCLOSURE OF THE INVENTION. That is, in the heretofore described working example, the automatic transmission 25 and speed change ECU 21 which can transmit the power imparted to the input shaft 26 to the output shaft 27 while changing the speed by switching an engagement side frictional engagement element which is one of the clutches C1 to C3 and brakes B1 and B2 which are a plurality of hydraulic frictional engagement elements, each of which operates with the hydraulic pressure from the hydraulic control unit, from the released condition to the engaged condition, correspond to a "transmission device", the speed change ECU 21 which executes the engagement control including the torque phase control after executing the fast fill control, which controls the hydraulic control unit in such a way that the hydraulic servo of an engagement side frictional engagement element such as the clutch C3 is filled with hydraulic oil, and the standby control, which controls the hydraulic control unit in such a way that the hydraulic pressure for the hydraulic servo of the relevant engagement side frictional one is maintained at the preset standby pressure, when upshifting the speed in the accelerator on condition, corresponds to "speed change control unit", and the speed change ECU 21 which executes the fast fill time correction routine of FIG. 7, and corrects the fast fill time to the increment side when the fluctuation in the rotational acceleration dNi of the input shaft 26 exceeding the degree based on the threshold values dNi1, ddNiref, and dNi3 acting as the preset determination references is detected after the latest standby control, corresponds to "correction unit". However, as the correspondence relationship between the main elements of the working example and modification examples and the main elements of the invention described in the section of DISCLOSURE OF THE INVENTION is one example for the working example to specifically describe the mode for carrying out the invention described in the section of DISCLOSURE OF THE INVENTION, it does not limit the elements of the invention described in the section of DISCLOSURE OF THE INVENTION. That is, the working example is only one specific example of the invention described in the section of DISCLOSURE OF THE INVENTION, and the interpretation of the invention described in the section of DISCLOSURE OF THE INVENTION should be made based on the description of the section.

Heretofore, an embodiment of the invention has been described using the working example but, the invention not being limited to the heretofore described working example in any way, it goes without saying that various modifications can be made without departing from the scope of the invention.

The invention is applicable in a transmission device manufacturing industry.

What is claimed is:

1. A transmission device which can transmit power imparted to an input shaft to an output shaft while changing a speed by switching an engagement side frictional engagement element, which is at least one of a plurality of hydraulic frictional engagement elements which operate with hydraulic pressure from a hydraulic control unit, from a released condition to an engaged condition, comprising:
   a speed change control unit which, when upshifting the speed in an accelerator on condition, executes an engagement control including a torque phase control after executing a filling control, which controls the hydraulic control unit in such a way that a hydraulic servo of the engagement side frictional engagement element is filled with hydraulic oil, and a standby control, which controls the hydraulic control unit in such a way that hydraulic pressure for the hydraulic servo is maintained at a preset standby pressure; and
   a correction unit which corrects at least one of an execution time of the filling control and the standby pressure to an increment side when a fluctuation in a rotational acceleration of the input shaft exceeding a preset determination reference is detected after the torque phase control has been started until the torque phase control finishes.

2. The transmission device according to claim 1, wherein the correction unit corrects at least one of the execution time of the filling control and the standby pressure to the increment side on the condition that a value obtained by subtracting a minimum value of the rotational acceleration of the input shaft in a period from an amount of change in the rotational acceleration exceeding a predetermined amount after the torque phase control has been started until the torque phase control finishes from a rotational acceleration of the input shaft at the start of the torque phase control is equal to or greater than a first threshold value acting as the determination reference.

3. The transmission device according to claim 2, wherein the correction unit corrects at least one of the execution time of the filling control and the standby pressure to the increment side on the condition that a minimum value of a per unit time amount of change in the rotational acceleration of the input shaft in the period from the amount of change in the rotational acceleration exceeding the predetermined amount after the torque phase control has been started until the torque phase control finishes is less than a second threshold value acting as the determination reference.

4. The transmission device according to claim 3, wherein the correction unit corrects at least one of the execution time of the filling control and the standby pressure to the increment side on the condition that a difference between a minimum value of the rotational acceleration of the input shaft in the period from the amount of change in the rotational acceleration exceeding the predetermined amount after the torque phase control has been started until the torque phase control finishes and a maximum value of the rotational acceleration of the input shaft after an occurrence of the minimum value is equal to or greater than a third threshold value acting as the determination reference.

5. The transmission device according to claim 1, wherein the correction unit corrects at least one of the execution time of the filling control and the standby pressure to the increment side on the condition that a time from the torque phase control being started until the amount of change in the rotational acceleration of the input shaft exceeds the predetermined amount is equal to or greater than a predetermined time.

6. The transmission device according to claim 4, further comprising:
   a determination unit which determines whether or not a fluctuation in the rotational acceleration of the input shaft caused by a start of engagement of the engagement side frictional engagement element has occurred while the standby control is executed, wherein
   when it is determined by the determination unit that the fluctuation in the rotational acceleration of the input shaft caused by the start of engagement of the engagement side frictional engagement element has not occurred, the correction unit determines whether or not the fluctuation in the rotational acceleration of the input shaft exceeding the determination reference has been detected after the standby control.

7. The transmission device according to claim 6, wherein when a value obtained by subtracting the rotational acceleration of the input shaft at the start of the torque phase control from a maximum value of the rotational acceleration of the input shaft while the filling control is executed is less than a preset fourth threshold value, the determination unit determines that the fluctuation in the rotational acceleration of the input shaft caused by the start of engagement of the engagement side frictional engagement element has not occurred while the standby control is executed.

8. A control method of a transmission device which can transmit power imparted to an input shaft to an output shaft while changing a speed by switching an engagement side frictional engagement element which is at least one of a plurality of hydraulic frictional engagement elements, each of which operates with hydraulic pressure from a hydraulic control unit, from a released condition to an engaged condition, comprising:
   (a) a step of, when upshifting the speed in an accelerator on condition, executing an engagement control including a torque phase control after executing a filling control, which controls the hydraulic control unit in such a way that a hydraulic servo of the engagement side frictional engagement element is filled with hydraulic oil, and a standby control, which controls the hydraulic control unit in such a way that hydraulic pressure for the hydraulic servo is maintained at a preset standby pressure; and
   (b) a step of correcting at least one of an execution time of the filling control and the standby pressure to an increment side when a fluctuation in a rotational acceleration of the input shaft exceeding a preset determination reference is detected after the torque phase control has been started until the torque phase control finishes.

* * * * *